Oct. 20, 1931.  W. ROM  1,828,444
METHOD OF AND APPARATUS FOR RECORDING SOUND ON MOTION PICTURE FILMS
Filed Nov. 15, 1928  2 Sheets-Sheet 1

Inventor:
William Rom.
by: Charles W. Lilly

Oct. 20, 1931.  W. ROM  1,828,444
METHOD OF AND APPARATUS FOR RECORDING SOUND ON MOTION PICTURE FILMS
Filed Nov. 15, 1928  2 Sheets-Sheet 2
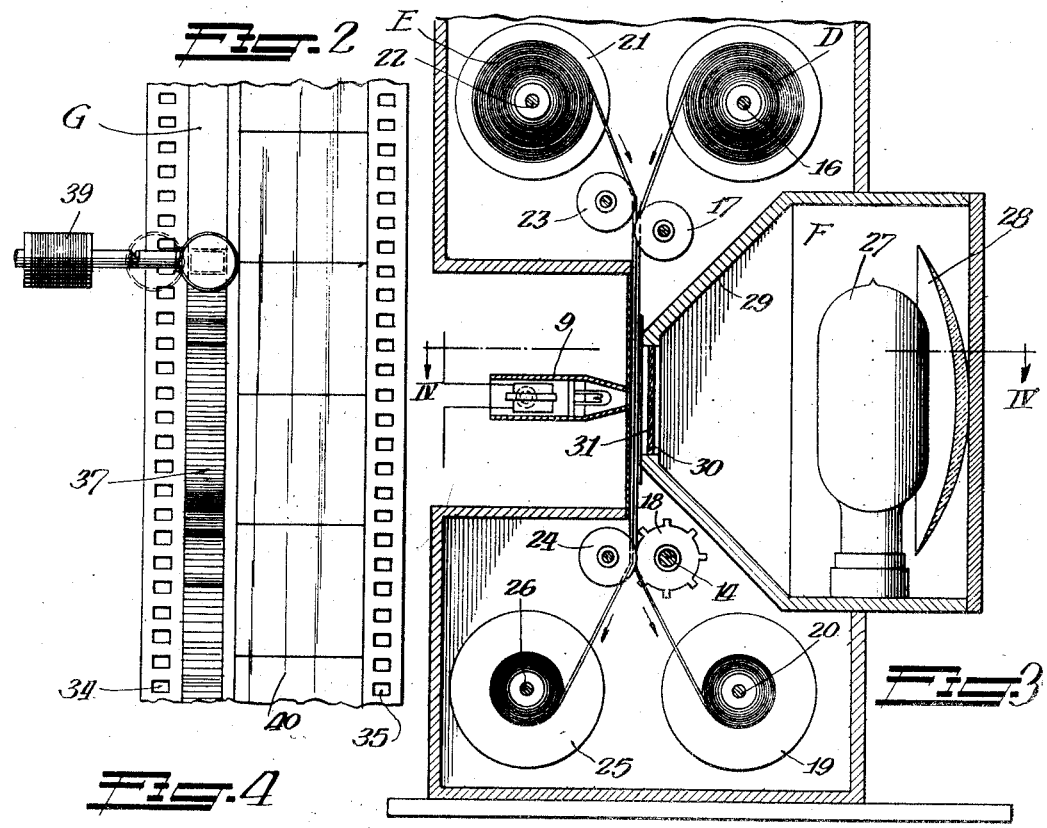
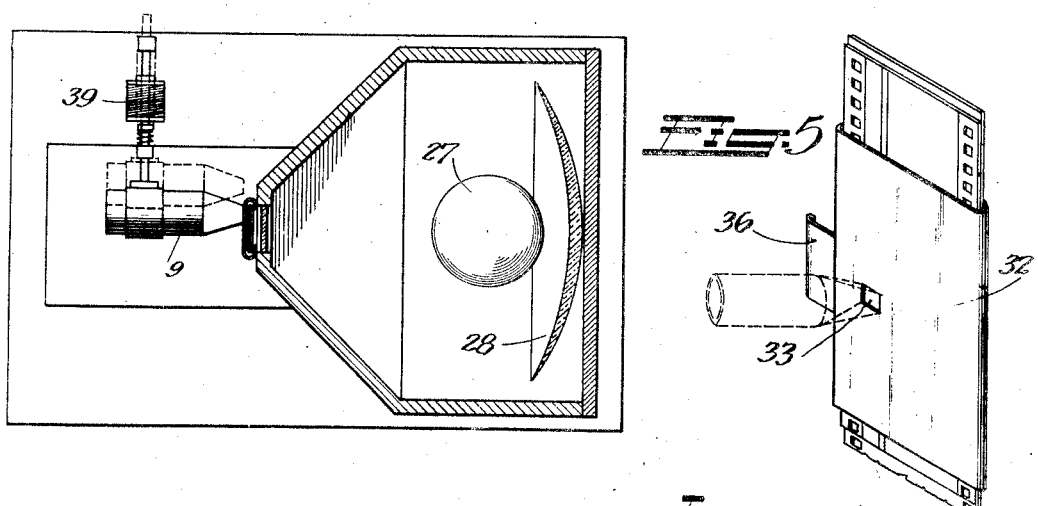
Inventor:
William Rom.

Patented Oct. 20, 1931                                           1,828,444

UNITED STATES PATENT OFFICE

WILLIAM ROM, OF BERWYN, ILLINOIS

METHOD OF AND APPARATUS FOR RECORDING SOUND ON MOTION PICTURE FILMS

Application filed November 15, 1928. Serial No. 319,515.

This invention relates to a method of and apparatus for recording sound on motion picture films and has particular reference to the adding of sound to films which has already been completed as motion picture films.

According to this invention a new negative film is made from the positive of an old film containing pictures only, by putting a positive of the old film through a projector, operating a printing machine with another positive of the film in the printing machine, printing a new negative from the positive, masking a portion of the picture on the positive film and recording sound on the portion of the new negative masked with respect to the positive film. The projecting machine and the printing machine are driven in synchronism so that the sound whatever it may be, such as singing, speaking, music, and the like, may be applied at the right places on the new negative of the old film and as correctly representing the sound depicted by any particular picture on the old film.

An object of the invention is to provide a method of and apparatus for recording sound on motion picture films which have been completed as motion pictures only.

Another object of the invention is to provide an apparatus for making a new negative from an old picture and recording on the new negative sound in proper places as shown by the old picture, together with means for controlling the recording of the sound on the new negative.

A further object of the invention is to provide a method for readily recording sound on moving picture films of pictures which have heretofore been finished as moving pictures.

Another object of the invention is to provide an improved method and apparatus for readily applying sounds to film pictures heretofore completed, resulting in a new film, combining the pictures of the old and the recorded sounds.

The above, other and further objects of the invention will be apparent from the following description, accompanying drawings and appended claims.

The accompanying drawings, certain of which are somewhat schematic in form, have been chosen to illustrate one embodiment of the invention and the views of the illustrated drawings are as follows:

Figure 2 is a fragmental elevational view diagrammatic in form of a negative made in accordance with this invention.

Figure 3 is a fragmental vertical central sectional view of a printing machine embodying this invention.

Figure 4 is a horizontal sectional view of certain parts of the apparatus of Figure 3 taken on line IV—IV of Figure 3.

Figure 5 is a perspective view of the film guide immediately in front of the opening in the printing machine showing in dotted lines the position of a sound recording light and in full lines a slide for cutting out the effects of the sound recording light when necessary.

As shown on the drawings:

Figure 1 illustrates diagrammatically an arrangement whereby a film may be made from a film already taken and having sounds added to said film.

Figure 1:
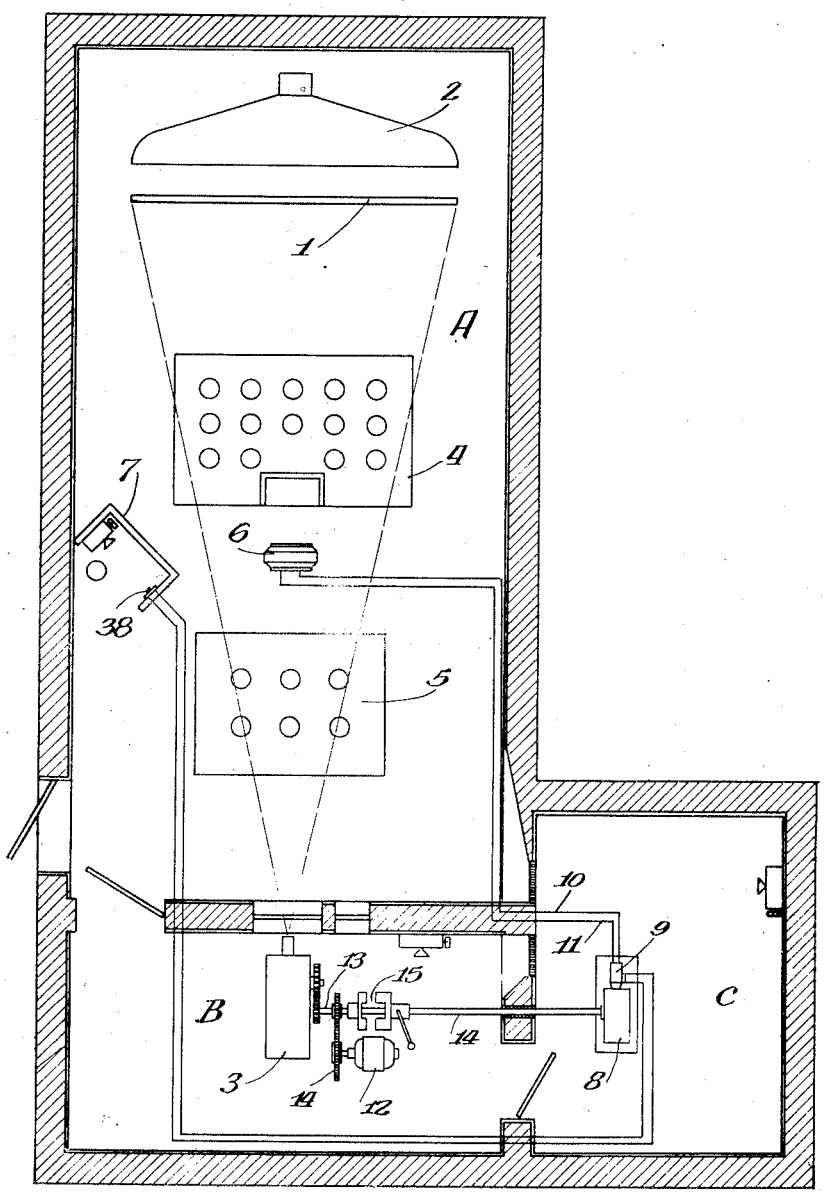
Figure 1 is a schematic plan of a room arrangement consisting of a projecting room, a show room and a printing room for carrying out the method of this invention.

Figure 1 discloses an audience room A, a projecting room B and a printing room C, all of which are sound proof and so arranged that sound emanating in the audience room A will not be communicated to the printing room C except through the microphone.

A picture screen 1 is arranged near one end of the audience room A and back of it may be a loud speaker 2.

A projecting machine 3 is arranged in the projecting room B to exhibit pictures on the screen 1 in a manner well understood.

A stage or platform 4 for musicians let us say is arranged as shown in Figure 1 while another platform 5 is arranged for actors. A microphone 6 is disposed between the platforms 4 and 5 so as to catch all sounds made in the audience room A.

A director's stand is represented at 7.

The printing chamber C contains a film printing machine designated generally at 8 and having a sound recording light 9 which is connected by conductors 10 and 11 with the microphone 6 in the audience room so that any sounds impressed on the microphone will be set up in the lamp 9 and thereby recorded on the film passing through the printing machine 8.

A motor 12 drives a shaft 13 through a gear train 14 which shaft is connected to the projector 3.

A shaft 14 connected to the printing machine 8 and arranged to drive the same is actuated from said motor 12 through a clutch represented diagrammatically at 15 so that whenever the motor 12 is operating and the clutch engaged, the projecting machine 3 and the printing machine 8 will be driven in synchronism.

A positive film of any picture which it is desired to reproduce with sound is placed in the projector 3 and shown on the screen 1. Actors representing those shown in the picture are grouped on the platform 5 representing the characters appearing on the screen on which actors are to speak, sing or otherwise reproduce the sounds made by the actors as shown on the screen. Musicians, if such be desired, may be seated on the platform 4, the musicians making whatever music is desired and as called for by the picture being shown. The positive film in the projecting machine 3 is run through a sufficient number of times so that the actors and musicians are familiar with the cues in order that the sounds, speaking, musical, and otherwise, may be reproduced faithfully at the proper times and by the proper persons. When the actors and musicians and others who are to take part in the recording of sound on the new film are ready, then another positive film of the same picture which appears in the projecting machine 3 is inserted in the printing machine 8, positive film D as shown in Figure 3 being arranged on a shaft 16 in the printing machine. The free end of the positive film is trained over a roller 17, a driving roller or gear 18 and on to the take-up reel 19 which latter is supported on a shaft 20. The unexposed film which is to comprise the new negative E is supported in a reel 21 on shaft 22, the free end of said film is led over a roller 23, another roller 24 and on to reel 25 supported on a shaft 26 near the lower part of the printing machine.

A chamber F comprising a part of the printing machine 8 contains a light 27 behind which is a reflector 28. The front portion of the chamber F is arranged with converging walls 29 coming down to an opening 30 in which is placed if desired a transparent panel of glass or the like 31.

A guide 32 is arranged in front of the opening 30 in said chamber F and receives the films D and E maintaining the same in close contact in front of the opening 30 so that the light from the tube 27 may expose the new negative film E to the pictures appearing on the positive film D thus making a new negative film.

The films D and E are arranged so that the sensitized surfaces of each are in contact where the same pass through the guide 32, however, this arrangement is not essential for reproduction of the new negative.

The guide 32 is provided with a small aperture 33 arranged near one of the lateral margins of the film.

A sound recording lamp 9 is disposed to shine through the opening 33 in the guide 32 and records the sound set up in the microphone 6 on the sound strip G of the new negative film E being recorded by the printing machine.

The positive film D of the picture which is being exhibited in the projector 3 has the pictures thereof extending substantially the full width of the film between the two rows of driving notches 34 and 35 as is customary.

A slide 36 is associated with the guide 32 so as to cover a portion of the opening 30 to reduce the width of the pictures reprinted on the new negative film E by the positive film D, thus providing a sound area G on the new negative.

Figure 2 represents diagrammatically at 37 the recorded sound impressed on the new negative E and received from the microphone 6 in the audience room A.

It is of course understood that when the operation of the printing machine is started, the positive film D will be synchronized with the positive film in the projector 3 so that the new negative E will be printed with the pictures as the same appear on the screen 1, thus serving as a guide to the actors and musicians furnishing the sounds which are to be recorded on the new negative film E.

It may so happen that in the reproduction of the new film E that the sounds are to be eliminated from portions of the new film. The director's stand 7 is provided with a control 38 which is connected to the sound recording lamp 9 so as to turn off the current of said lamp when no sounds are to be applied to the new film.

The lamp 9 is shown in Figures 2 and 4 of the drawings as being bodily movable by means of a solenoid 39. Should the solenoid be employed in preference to the turning on and off of the current to the lamp 9, then the control 38 in the director's stand 7 would be connected to the solenoid for bodily moving the lamp 9 into and out of registering position with the aperture 33 in the guide plate 32.

It is of course essential that no sounds occur in the audience room A during the reproduction of a new film E other than those necessary for such recording. The director therefore may control operations by means of light signals suitably arranged and understood. The only sound reaching the printing chamber C during the making of a film is that received from the microphone 6 through the conductors 10 and 11 to the lamp 9.

The driving gear 18 of the printing machine 8 which moves the films D and E through the printing machine in front of the light aperture 30 of the printing compartment is driven by the shaft 14 thus actuating the movement of the films D and E through the printing machine in synchronism with the projected positive film in the projector 3. This assures movement of the new film in synchronism with the old, thus making possible the recording of sound at the proper places and at the proper time.

The actors when reproducing spoken or sung sounds as shown by the actors in the picture must follow the movement of the lips of the actors appearing on the screen 1 so that the recorded sound will register properly with the depicted movement of the lips of the actors on the screen.

This invention has been illustrated somewhat diagrammatically in form but is believed to be clearly shown as to all essential features.

This invention lends itself readily to the recording of sound on films which have heretofore been finished in that there is reproduced a new negative with the pictures and the recorded sounds. Any kind of character of sounds may be readily reproduced on an old film in the manner herein described. Should it so happen that the picture is of such nature as to require many sundry kinds of sound, then the several kinds of sounds may be reproduced at different intervals if so desired inasmuch as the mechanism is operated in synchronism as to the old film being shown in the projector 3 and the new film E being printed in the printing machine 8.

The slide 36 for providing the sound area G in the new film is shown in the drawings as being manually operable, although it is of course understood this may be of any kind and operated in any desired manner.

Figure 2 shows a fragmental portion of a new negative E such as made in accordance with this invention showing the recorded sound in the area 37 and the pictures in the area 40. Titles may be imprinted in the area 40 or may be recorded in the sound area G as desired.

This invention lends itself very readily to the production of a sound film as it makes possible the recording of the pictorial parts of the film in advance of the recording of the sound so that any cut out additions, subtractions and the like in the pictorial part of the film may be made before the sound is recorded, thus reducing the expense of making a sound film and at the same time assuring a finished film of a greater accuracy.

This invention may be used for translating titles, etc., for use of films already made in foreign countries.

The invention has been described herein more or less precisely, yet it is to be understood that it is not limited to the exact apparatus and method described and illustrated, but that changes may be made in the arrangement and proportions of parts and that equivalents may be substituted without departing from the spirit and scope of the invention.

The invention is claimed as follows:

1. A method of recording sound on a moving picture film which consists in utilizing two positive films of the same picture and projecting one positive film onto a screen for guidance in applying sound to a negative film made from the other positive film of the same picture, driving said other positive of said film in synchronism with the projected film, masking a portion of said other positive to thereby provide an area for the sound record, driving a negative film in synchronism and printing relation with said other positive and with the sound area of said other positive masked as to said negative, and simultaneously recording sound on the sound area of said new negative, the sound record being applied to the sound area of said negative in accordance with the projected positive of the same picture.

2. An apparatus for printing sound and pictures on a moving picture film which comprises in combination, a projector, a negative printing machine, driving means connected to each to drive both in synchronism, said negative printing machine being provided with means for masking a portion of the negative to provide an area thereon for the sound record, a sound recording device associated with said printing machine to make the sound record on the sound area of the negative passing through said printing machine simultaneously with the printing of pictures thereon, the projector being operated to project another film with the same picture being printed in the printing machine, and means for regulating said sound recording device so as to apply sounds to the sound area of the negative in proper positions thereon as exemplified by the pictures being projected of another film of the same picture.

3. A device of the character described comprising in combination, a projector, a negative printing machine, driving means connected to said projector and said printing machine for driving the same in synchronism, means for supporting a positive film in said printing machine, means for supporting an unexposed negative film in said printing machine, said projector being supplied with a positive film of the same picture as the positive in the printing machine, means in the printing machine for masking portions of the negative passing through the printing machine to thereby provide an area for the sound record, a light chamber, means for moving said positive and said negative films through said printing machine and in front of said light chamber, and means for recording sound on the sound area.

In testimony whereof I have hereunto subscribed my name at Chicago, Cook County, Illinois.

WILLIAM ROM.